United States Patent [19]

Sheu

[11] Patent Number: 5,595,108
[45] Date of Patent: Jan. 21, 1997

[54] FAST ASSEMBLED OIL-COLLECTING THROUGH AND CLIP RING STRUCTURE

[76] Inventor: Jin-Yuh Sheu, 2nd Fl. No. 25, Sec. 3, Jen-Ai Rd., Taipei, Taiwan

[21] Appl. No.: 616,123

[22] Filed: Mar. 14, 1996

[51] Int. Cl.⁶ .............................. A47J 27/00; A47J 27/58; B65D 51/00; B65D 51/16
[52] U.S. Cl. ................ 99/425; 99/400; 99/422; 99/413; 99/446; 220/367.1; 220/368; 220/369; 220/912
[58] Field of Search ............................. 99/339, 340, 337, 99/342, 403, 422–425, 444–446, 400, 401, 413; 220/316, 408, 626, 912, 4.03, 335, 367.1–374, 731, 256; 126/373, 385, 384, 390; D7/354, 361, 391

[56] References Cited

U.S. PATENT DOCUMENTS

| | | | |
|---|---|---|---|
| 3,797,693 | 3/1974 | Baker | 220/370 |
| 3,831,002 | 8/1974 | Mysicka et al. | 99/425 X |
| 4,000,830 | 1/1977 | French | 220/369 |
| 4,045,606 | 8/1977 | Kalkowski | 99/446 X |
| 4,091,956 | 5/1978 | Vecchio | 126/384 |
| 4,258,694 | 3/1981 | Kato | D7/361 X |
| 4,298,135 | 11/1981 | Vossen | 220/369 X |
| 4,320,699 | 3/1982 | Binks | 99/422 X |
| 4,482,077 | 11/1984 | Henderson | 220/374 |
| 4,636,618 | 1/1987 | Jenicot | 220/368 X |
| 4,700,689 | 10/1987 | Speker | 126/384 |
| 4,832,225 | 5/1989 | Benjamin | 99/413 X |
| 5,377,859 | 1/1995 | Hacker | 220/912 X |

*Primary Examiner*—Timothy F. Simone
*Attorney, Agent, or Firm*—Pro-Techtor International

[57] ABSTRACT

A fast assembled oil-collecting trough and clip ring structure, including a conic glass-made fry pan cover and a circular clip ring disposed on an edge of the fry pan cover. The clip ring has a vertical flange formed along the periphery of the clip ring. The flange is formed with at least three integrally made vertical tabs each having an insertion hole. The tab is formed with an orifice for a rivet to pass through so as to rivet a resilient plate with the tab. The resilient plate is a flexible metal plate having an arch projection at middle section. The projection is faced toward the center of the clip ring. When the fry pan cover is assembled with the clip ring, the projection of the resilient plate latches the projecting frame of the fry pan cover so as to fast and easily associate the fry pan cover with the clip ring. The resilient plate serves to firmly clamp the fry pan cover without detachment. The fry pan cover can be also fast and easily separated from the clip ring for cleaning the same independently.

4 Claims, 7 Drawing Sheets

FAST ASSEMBLED OIL-COLLECTING THROUGH AND CLIP RING STRUCTURE

BACKGROUND OF THE INVENTION

The present invention relates to a fast assembled oil-collecting trough and clip ring structure, including a conic glass-made fry pan cover and a circular clip ring disposed on the edge of the trough. The fry pan cover can be fast and easily associated with the clip ring without detachment. The fry pan cover can be also fast and easily separated from the clip ring for cleaning the same independently.

A conventional fry pan cover is generally an integral structure. Some other fry pan covers are disposed with a grip or a projecting handle. Moreover, European Patent Publication No. EP0192163B1 filed on Nov. 10, 1989 and entitled "cover for frying and cooking appliances" as shown in FIG. 1 discloses an assembly of a fry pan cover and a clip ring. The fry pan cover 1a is assembled with the clip ring 3a by means of several clip members 2a in such a manner that one end of the clip member 2a is hung on the clip ring 3a, while the other end thereof is for the fry pan cover 1a to place thereon. According to such arrangement, the clip member 2a cannot tightly associate the fry pan cover with the clip ring.

Taiwanese Patent Publication No. 209996 filed on Feb. 24, 1993 and entitled "novel fluid type fry pan cover structure" as shown in FIG. 2 discloses a fry pan cover 1b assembled with a clip ring 3b by means of several latch clips 2b. Such measure also fails to tightly secure the clip ring to the fry pan cover.

SUMMARY OF THE INVENTION

It is therefore a primary object of the present invention to provide a fast assembled oil-collecting trough and clip ring structure, including a conic glass-made fry pan cover and a circular clip ring disposed on an edge of the trough. The fry pan cover can be fast and easily assembled with the clip ring without detachment. The fry pan cover can be also fast and easily separated from the clip ring.

According to the above object, the clip ring has a vertical flange formed along the periphery of the clip ring. The flange is formed with at least three integrally made vertical tabs each having an insertion hole. The tab is formed with an orifice for a rivet to pass through so as to rivet a resilient plate with the tab. The resilient plate is a flexible metal plate having an arch projection at middle section. The projection is faced toward the center of the clip ring. When the fry pan cover is assembled with the clip ring, the projection of the resilient plate latches and clamps the projecting frame of the fry pan cover so as to fast and easily associate the fry pan cover with the clip ring. The resilient plate also permits the fry pan cover to be fast and easily separated from the clip ring.

The present invention can be best understood through the following description and accompanying drawing, wherein:

DETAILED DESCRIPTION OF THE PREFERRED EMBODIMENT

Figure 1:
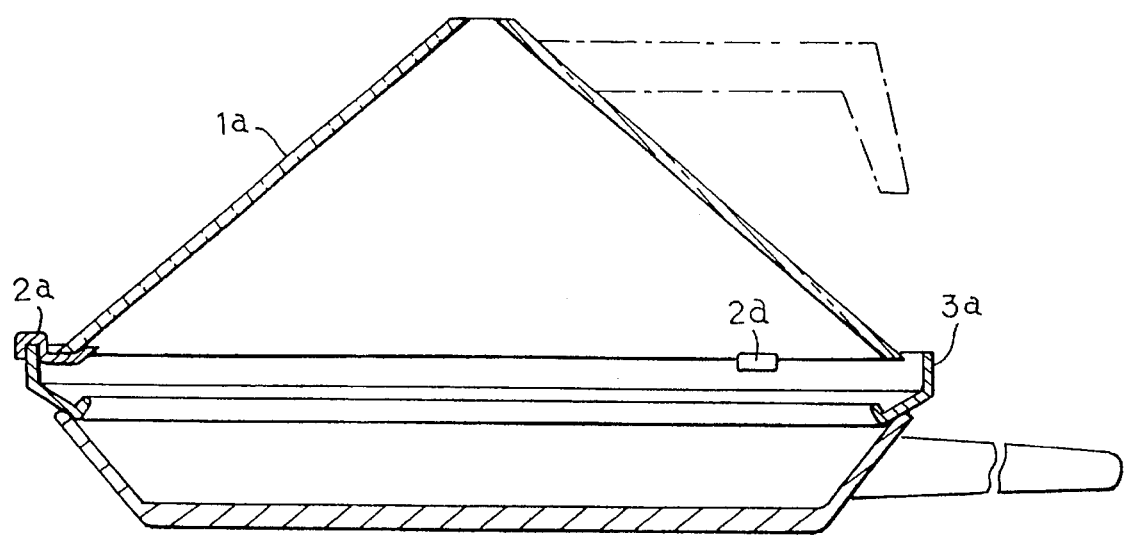
FIG. 1 is a side sectional view of a conventional assembly of a fry pan cover and a clip ring.
Figure 2:
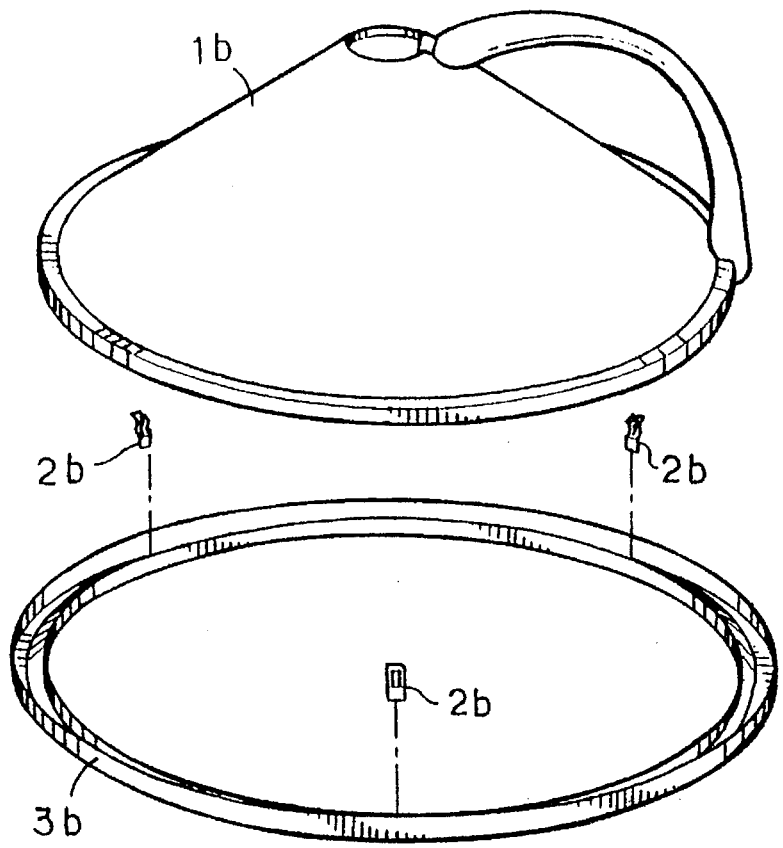
FIG. 2 is a perspective exploded view of another conventional assembly of a fry pan cover and a clip ring.
Figure 2:
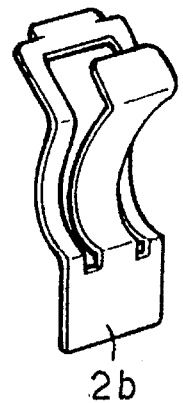
Figure 3:
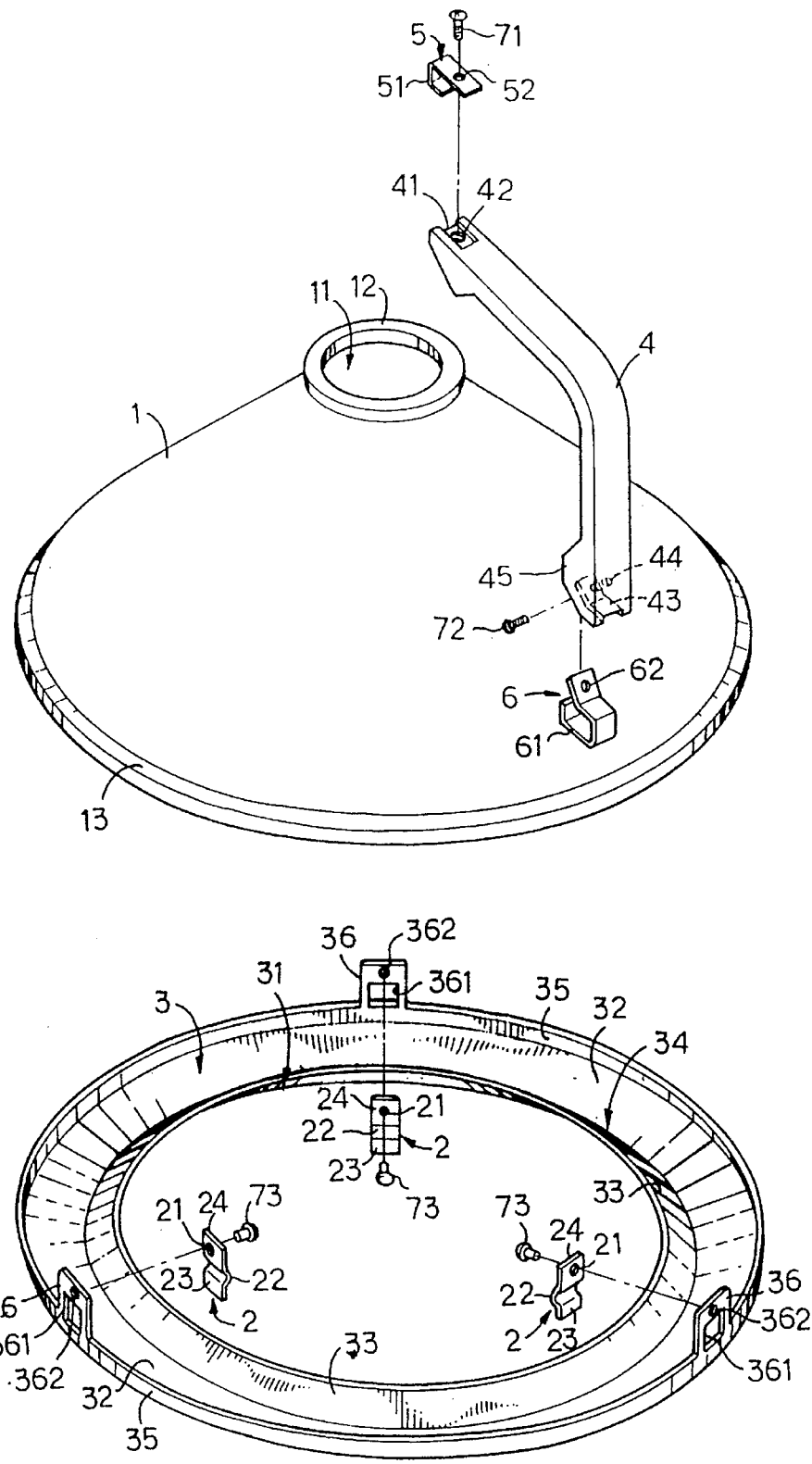
FIG. 3 is a perspective exploded view of the present invention.
Figure 4:
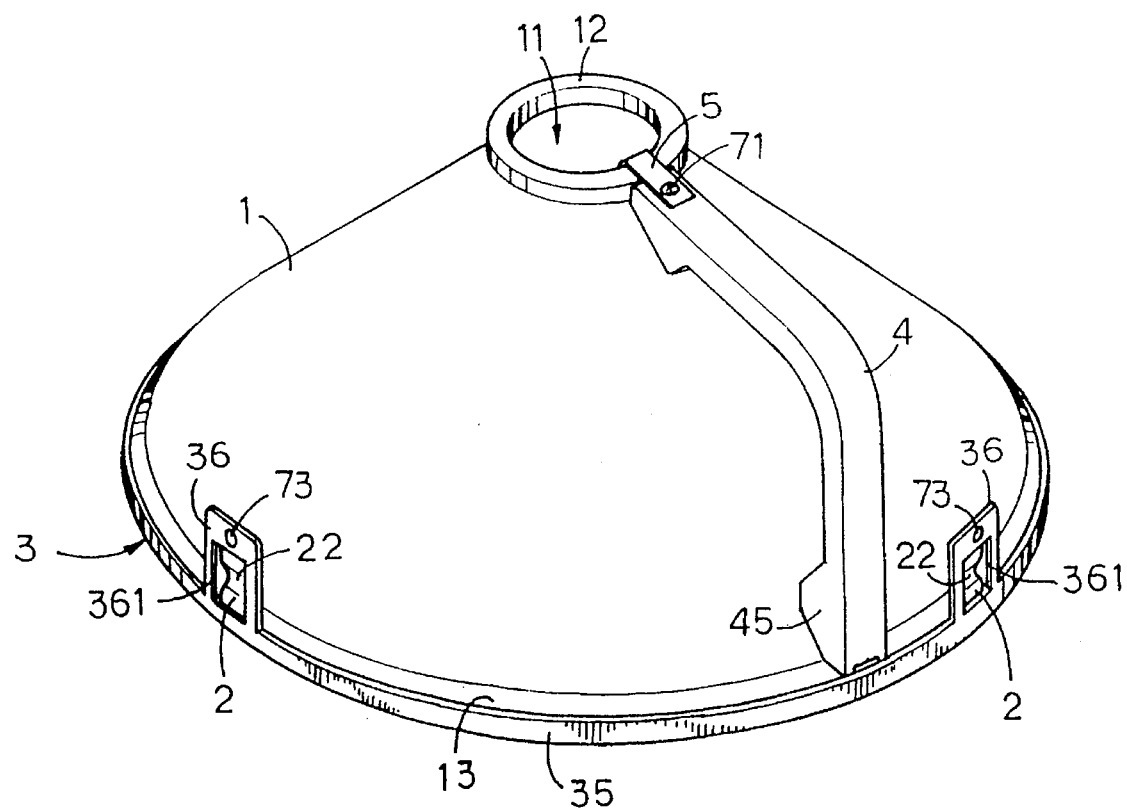
FIG. 4 is a perspective assembled view of the present invention.

Please refer to FIGS. 3 and 4. The present invention includes a conic glass-made fry pan cover 1, a circular clip ring 3 and at least three resilient plates 2, an arch handle 4 disposed on the fry pan cover and an upper and a lower latch plates 5, 6.

Figure 5:
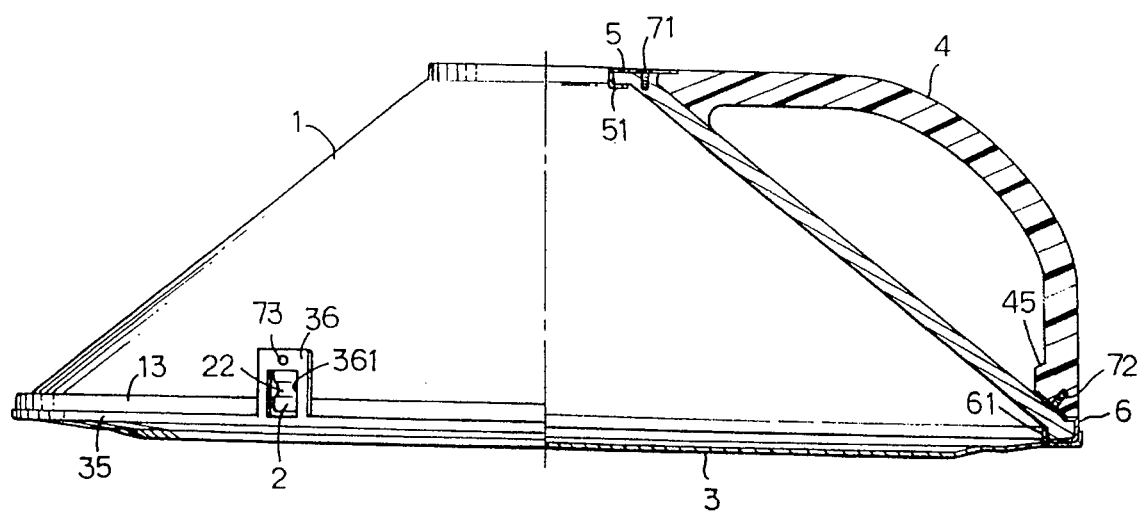
FIG. 5 is a partially sectional view of the present invention.

The center of the top portion of the fry pan cover 1 is formed with an opening 11 having a peripheral flange 12. The bottom edge of the fry pan cover is formed with a projecting frame 13. The upper end of the handle 4 is formed with a recess 41 in which a vertical thread hole 42 is disposed. The upper latch plate 5 is inserted in the recess 41. A screw 71 is passed through a hole 52 of the upper latch plate 5 into the thread hole 42 and tightened therein. One end of the upper latch plate 5 is formed with a bent hook 51 for hooking the flange 12 of the fry pan cover 1 so as to associate the upper end of the handle with the flange 12 as shown in FIG. 5. The bottom end of the handle 5 is formed with a projecting seat 45 the bottom face of which is formed with a dent 43. A horizontal thread hole 44 is formed at the top end of the dent 43. The lower latch plate 6 is inserted in the dent 43 and a screw 72 is passed through a hole 62 of the top end of the lower latch plate 6 into the thread hole 44 and tightened therein. The upper half section of the lower latch plate 6 is designed corresponding to the shape of the dent 43 of the bottom end of the handle 4 and the lower half section thereof is designed as a bent hook 61 corresponding to the shape of the projecting frame 13 of the bottom edge of the fry pan cover for hooking the projecting frame so as to secure the lower end of the handle thereto.

Figure 6:
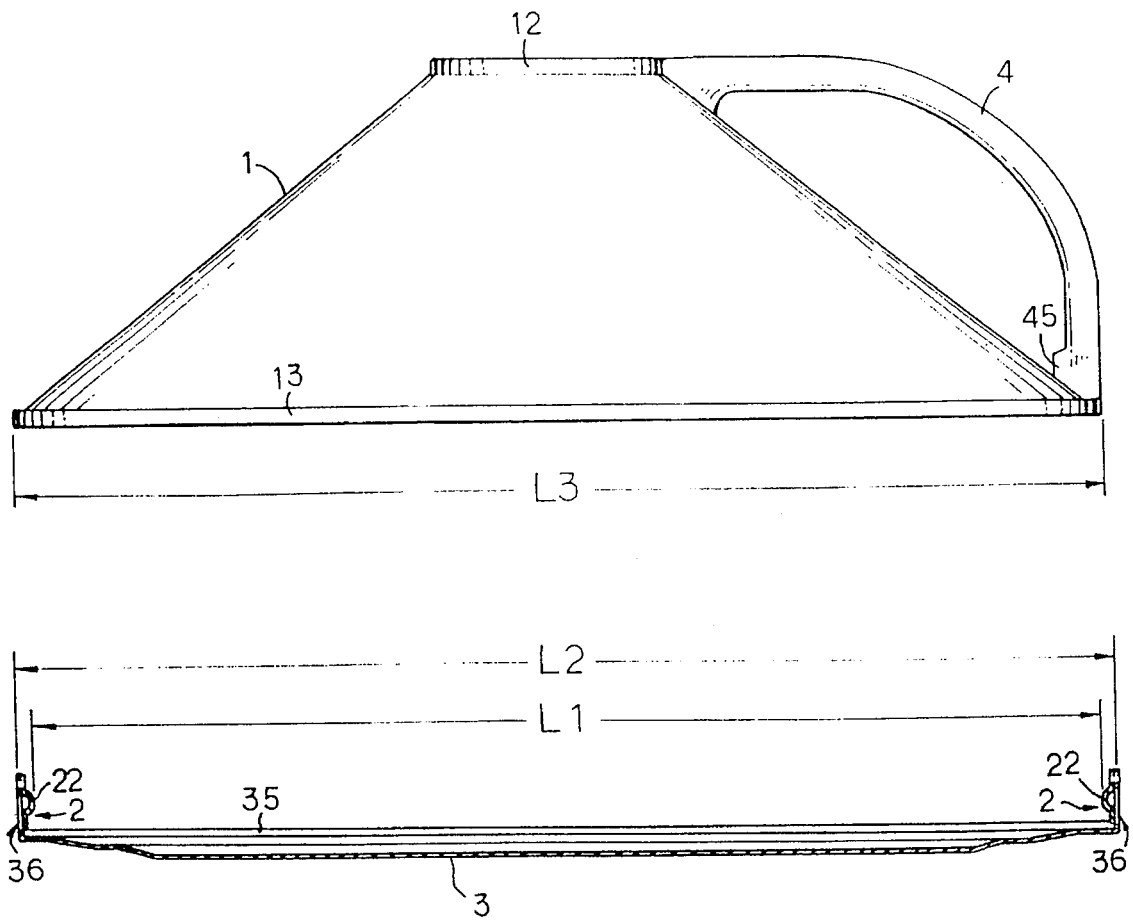
FIG. 6 shows the dimension of the fry pan cover and the clip ring of the present invention.

The clip ring 3 has a circular hole 31 and the bottom face 32 of the clip ring is an inclined face. Between the inclined face and the circular hole 31 is an inclined angle projecting conic frame 33 so that a connection portion between the inclined face 32 and the conic frame 33 is a valley portion serving as an oil-collecting trough 34. Alternatively, the bottom face of the clip ring 3 can be changed from the smooth inclined face into a stepped inclined face as shown in FIG. 6. Both the smooth and stepped inclined face are able to collect the oil.

In addition, a flange 35 is formed along the periphery of the clip ring 3. The flange 35 is formed with at least three integrally made vertical tabs 36 each having an insertion hole 361. The dimension of the insertion hole is determined by the profile and size of the resilient plate 2. The tab 36 can be rectangular or arch or semicircular and formed with an orifice 362 for a rivet 73 to pass through an orifice 21 of upper end of the resilient plate 2 into the orifice 362 so as to rivet the resilient plate with the tab. The resilient plate 2 is a flexible metal plate having an arch projection 22 at middle section. The projection 22 is faced toward the center of the clip ring so that the diameter L1 between the opposite projections 21 is less than the diameter L2 of the clip ring 3 as shown in FIG. 6. The diameter L3 of the fry pan cover 1 is substantially equal to the diameter L2 of the clip ring so that the diameter L3 of the fry pan cover is larger than the diameter L1 between the projections 21.

Figure 7:
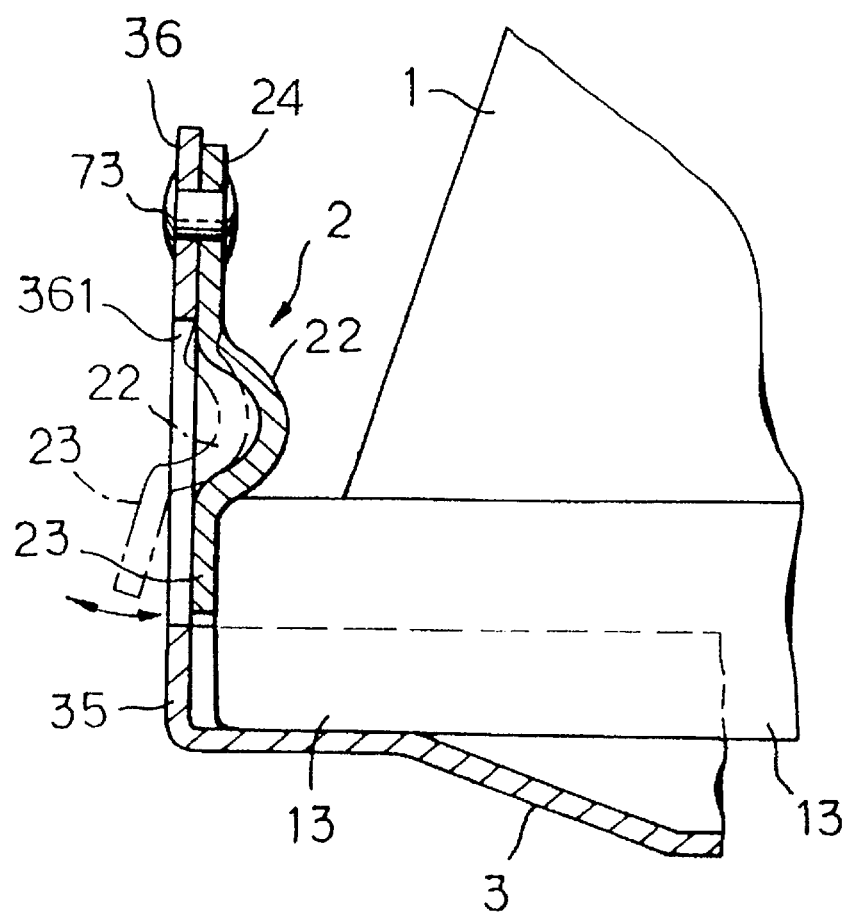
FIG. 7 shows that the projecting frame of the fry pan cover is latched and clamped by the resilient plates riveted with the tab of the clip ring of the present invention.

Please refer to FIG. 7. The resilient plate 2 has a bottom latching end 23 connected under the projection 22 and an upper plane end 24 having an orifice 21 and connected above the projection 22. The plane upper end contacts with the flange 35 of the clip ring 3 on a plane so that the rivet 73 can tightly bind the resilient plate therewith without any clearance. The upper end of the resilient plate 2 is riveted and fixed, while the lower end thereof is not fixed and is movable so as to create a resilient effect. In addition, the tab 36 is formed with an insertion hole 361 within which the resilient plate is resiliently biasable.

Before the fry pan cover 1 is assembled with the clip ring 3, the projecting frame 13 of the fry pan cover will bias the projection 22 of the resilient plate into the insertion hole 361 of the tab 36. After the projecting frame 13 passed through the projection, the projection is restored to its home position. At this time, the projecting frame 13 is latched by the arch latching end 23 of the resilient plate and associated with the clip ring. The latching end 23 of the resilient plate serves to firmly clamp the fry pan cover 1 without detachment. Reversely, when it is desired to separate the fry pan cover 1 from the clip ring 3, the above procedure is reversely performed so as to disassemble the fry pan cover from the clip ring for cleaning the same independently.

The present invention has the following advantages:

1. The resilient plate and the tab of the clip ring are separately manufactured so that the resilient plate can create greater resilient effect and clamping force.
2. The upper end of the resilient plate and the upper end of the tab of the clip ring are riveted together so that the upper end of the resilient plate is tightly closed without opening and when the fry pan cover is inserted into the clip ring, the resilient plate will not form an obstacle.
3. The tab and the clip ring are integrally made and easily punched without difficulty.
4. The resilient plate serves to tightly and firmly associate the fry pan cover and the clip ring without loosening. The assembly and disassembly of the fry pan cover and the clip ring can be easily performed by the user.

It is to be understood that the above description and drawings are only used for illustrating one embodiment of the present invention, not intended to limit the scope thereof. Any variation and derivation from the above description and drawings should be included in the scope of the present invention.

What is claimed is:

1. A fast assembled oil-collecting trough and clip ring structure, comprising a conic glass-made fry pan cover, a circular clip ring disposed on an edge of the fry pan cover, at least three resilient plates for associating the fry pan cover with the clip ring, an arch handle disposed on the fry pan cover, an upper latch plate secured on upper end of the handle and a lower latch plates secured on lower end of the handle, said structure being characterized in that:

the clip ring has a vertical flange formed along the periphery of the clip ring, the flange being formed with at least three integrally made vertical tabs each having an insertion hole, the dimension of the insertion hole being determined by the profile and size of the resilient plate, the tab being formed with an orifice for a rivet to pass through an orifice of upper end of the resilient plate into the orifice so as to rivet the resilient plate with the tab, the resilient plate being a flexible metal plate having an arch projection at middle section, the projection being faced toward the center of the clip ring.

2. A trough and clip ring structure as claimed in claim 1, wherein the resilient plate has an arch bottom end connected under the projection and a plane upper end having an orifice and connected above the projection, the plane upper end contacting with the flange of the clip ring on a plane so that the rivet can tightly bind the resilient plate therewith without any clearance.

3. A trough and clip ring structure as claimed in claim 1, wherein the tab is rectangular.

4. A trough and clip ring structure as claimed in claim 1, wherein the tab is arch.

\* \* \* \* \*